United States Patent Office 3,135,596
Patented June 2, 1964

3,135,596
PROCESS FOR PREPARING QUICK RELEASE
HIGH-NITROGEN FERTILIZER
Louis M. Sesso, Racine, Wis., assignor to S. C.
Johnson & Son, Inc., Racine, Wis.
No Drawing. Filed Apr. 20, 1961, Ser. No. 104,263
1 Claim. (Cl. 71—64)

The present invention is directed to an improved lawn fertilizer. More particularly, the invention relates to rapid-release chemical fertilizers having a high nitrogen content.

Until about 1850, nearly all nitrogen containing fertilizers were derived from organic materials such as sewage sludge, cottonseed meal, fish scraps, dried animal manures, and the like. Since 1850, however, naturally occurring inorganic chemical compounds such as sodium nitrate, potassium nitrate, and more recently synthetic chemical compounds have largely replaced natural organics as a nitrogen source for fertilizers. Synthetic fertilizer ingredients have proven to be both less expensive and more desirable from a color and odor standpoint than natural organic materials.

A complete fertilizer contains substantial amounts of nitrogen, potassium, and phosphorus. The presence of these elements in a fertilizer commonly is indicated by listing in order the percentage of total N (nitrogen), available $P_2O_5$ (phosphorus pentoxide), and water-soluble $K_2O$ (potassium oxide or potash). A product analysis of 10–10–10 would mean that the fertilizer contained 10% N, 10% available $P_2O_5$, and 10% $K_2O$ and that the ratio of N-$P_2O_5$-$K_2O$ in the product was 1–1–1.

A number of synthetic chemical compounds have been used as a source of nitrogen for fertilizing purposes. These compounds include ammonium sulfate which can be produced by reacting ammonia with sulfuric acid, ammonium nitrate which is formed by reacting ammonia gas with nitric acid, sodium nitrate, calcium nitrate, urea, etc. When placed in contact with the soil, these products break down rather rapidly to provide nitrogen as ammoniacal or nitrate ions to growing plants.

A disadvantage of known fertilizers containing high concentrations of soluble fertilizer salts is that plant tissues, leaves or roots are killed by the withdrawal of water when the fertilizer comes in contact with them. It was felt that injury to plants could only be avoided by either applying less fertilizer or by sprinkling the lawn with water immediately after fertilizing in order to wash the fertilizer off the grass.

Within the last twenty years it was discovered that urea-formaldehyde polymers could be used as a fertilizer ingredient and that these polymers would slowly decompose to yield nitrogen over long periods of time. Using a product of this type made it possible to maintain a given nitrogen level in the soil for a complete growing season without requiring periodic fertilizer applications provided the proper soil moisture and bacteric levels were present.

Although the discovery of controlled release fertilizers such as urea-formaldehyde resins represented a notable advance in the art, these products also had disadvantages as fertilizers. It has been found that desirable grasses in certain parts of the country (particularly the northern half of the United States) are more efficiently aided in their fight against weeds by a quick-release fertilizer. A rapidly available nitrogen source allows grasses to make a strong turf in the cool spring and early summer. During the hottest part of the summer these grasses are semi-dormant and weeds such as crabgrass and the like are active and are looking for nourishment. This nourishment is often available when a controlled release fertilizer is present. In early fall it is again helpful to apply a rapid-release fertilizer to the soil in order to encourage the revived grasses in their effort to squeeze out the existing weeds.

Additionally, as is pointed out in U.S. Patent 2,827,368, urea-formaldehyde fertilizers will burn plants unless special precautions are taken. A still further disadvantage of the use of urea-formaldehyde resins as fertilizer ingredients is that they are appreciably more expensive than other synthetic products such as urea, ammonium nitrate, ammonium sulfate, etc.

It is an object of the present invention to provide an improved fertilizer containing high levels of nitrogen along with phosphorus and potassium.

Another object of the invention is to provide a process for preparing an improved rapid-release fertilizer.

Still another object is to provide a rapid-release fertilizer which contains a high nitrogen content which can be applied in large quantities without burning grasses.

Other objects will become apparent to those skilled in the art from the following detailed description of the invention.

In general, the present invention comprises the discovery of a quick-release chemical fertilizer which can be applied to lawns in large quantities without injury to grasses.

It was found that such a product could be obtained if certain precautions were taken. One such precaution is that the finished product must have a particular particle size range in order to eliminate both fines and oversize particles which cause burning. It is also important that the reaction temperature prevailing in the granulator is maintained at a temperature below about 180° F. and that phosphoric acid be used as a reactant for anhydrous ammonia rather than sulfuric acid.

The essential ingredients used in preparing the subject product include urea, potassium chloride, phosphoric acid, and anhydrous ammonia. At least about 85% by weight of the fertilizer pellets should have a mesh size of from −8 to +18. Or stated differently, essentially all of the fertilizer should pass through an 8 mesh screen and at least about 85% by weight of the fertilizer should be retained by an 18 mesh screen.

In the present process commercial urea is passed through a suitable grinding device such as a hammer mill in order to regulate the size of the urea particles. Urea in the amount (percent by weight) and mesh size indicated in the first and second columns of the following table will provide a particle size for the finished fertilizer as specified in the third column.

TABLE I

| Urea (percent by weight) | Urea particle size | Fertilizer specification (percent by weight) |
|---|---|---|
| .50% max. | −6 to +8 mesh | 1% max. |
| 18% to 30% | −8 to +14 mesh | 50–100%. |
| 22% to 38% | −14 to +18 mesh | 25–50%. |
| 10% to 19% | −18 to +30 mesh | 10% max. |
| 5% to 12% | −30 to +40 mesh | 2% max. |
| 14% to 24% | Minus 40 | 1% max. |

The ground urea is charged in a continuous flow to a granulator along with potassium chloride, phosphoric acid, anhydrous ammonia, and water. The quantity of each ingredient is selected so as to provide a finished product containing at least 30% nitrogen and at least 5% of available $P_2O_5$, and 5% water-soluble potash. Preferably, the product will contain from 32% to 35% nitrogen, 6% to 8% $P_2O_5$, and 6% to 8% $K_2O$. The most preferred formulation is 34–7–7 which indicates a product containing 34% nitrogen, 7% $P_2O_5$, and 7% $K_2O$.

In general, a fertilizer product having the ratio of 30–

35% nitrogen, about 6–8% $P_2O_5$ and about 6–8% $K_2O$ can be achieved in the present process by utilizing from about 61% to about 73% by weight of urea, about 10% to about 13% by weight of potassium chloride, about 12% to about 16% by weight of phosphoric acid, from about 2% to about 3% by weight of anhydrous ammonia. From about 1% to about 2% of water should be added to the reaction vessel.

The temperature in the granulator is maintained below about 180° F. and preferably from about 140° F. to 150° F. during the reaction of the anhydrous ammonia and the phosphoric acid. The temperature in the granulator is controlled by the negative heat of solution of urea in the water. The temperature is also affected, of course, by the rate of feed, amount of recycled material, amount of water used, size of the granulator and room temperature. After the reaction between the phosphoric acid and ammonia has been completed, the product is passed to a drier where the moisture content is reduced to from about .5% to about 2% and preferably to about .5%. The product is then charged to a double deck screen having an 8 mesh top deck and 14 mesh bottom deck to remove both the oversize and the fines. It has been found that when using mechanical driven commercial screening equipment, a finished product having the specification stated in Table I will be obtained in this manner. Some fines which are retained by a 14 mesh screen will be in the range of $-8$ to $+18$ mesh size. The onsize product is coated by suitable products such as Micro-Cel E, a calcium silicate manufacture by Johns-Manville Company and then transferred to a storage container.

The following example illustrates the preparation of a typical fertilizer falling within the scope of this invention.

*Example 1*

The following raw materials were used in preparing the product.

Raw material: Quantity, lbs.
Potassium chloride_____ 221.0
Wet process phosphoric acid (51.2% $P_2O_5$) _____ [1] 292.0
Anhydrous ammonia_____ 77.2
Urea _____ 1439.5
Micro-Cel E_____ 11.3
                                      [2] 2041.0
                                      [3] 2000.0

[1] Contains 23% water.
[2] Moisture content 3.3%.
[3] Moisture content 1.3%.

The urea was ground in a hammer mill to provide a granule size within the range shown in Table I above. Specifically commercial urea having the particle size distribution indicated in the second column of Table II was ground to produce a composition having the particle size distribution indicated in the third column.

TABLE II

| Particle mesh size | Mesh size as received, percent | Ground mesh size, percent |
|---|---|---|
| −6 to +8 | 0.76 | -------- |
| −8 to +14 | 67.14 | 21.8 |
| −14 to +18 | 28.70 | 29.7 |
| −18 to +30 | 1.30 | 16.4 |
| −30 to +40 | 1.70 | 11.5 |
| Minus 40 | 0.40 | 20.6 |

The ingredients of the fertilizer were charged in a continuous flow to a granulator at a rate sufficient to produce 10 tons of product per hour. The rate in pounds per hour and the charging means for each ingredient is set forth below:

| Raw material | Rate, lbs./hr. | Charging means |
|---|---|---|
| (1) Potassium chloride. | 2,380 | Weigh feeder and elevator. |
| (2) Phosphoric acid | 2,860 | Stainless steel sparge line. |
| (3) Anhydrous ammonia. | 530 | Carbon steel sparge line. |
| (4) Urea | 14,570 | Weigh feeder and elevator. |
| (5) Water | 180 | Stainless steel sparge line together with the phosphoric acid. |
| (6) Recycle fines and ground oversize from product screening. | Varies; depends on conditions in granulator, drier, and screens. | Elevator. |

The Micro-Cel E coating agent was applied to the cooled screened onsize product at a continuous rate of 120 lbs. per hour.

The reaction temperature in the granulator was maintained at about 140–150° F. This compares with a temperature of 200–210° F. which prevails in most commercial fertilizer reactors.

Additional compositions having the analysis required by the present invention are obtained by processing the following ingredients (Examples 2–8) in the manner specified in Example 1.

*Example 2*

| | Pounds | N | $P_2O_5$ | $K_2O$ |
|---|---|---|---|---|
| Urea (46% N) | 1,457 | 670.2 | | |
| Anhydrous ammonia (82% N) | 53 | 43.5 | | |
| Wet (23% $H_2O$) phosphoric acid (54% $P_2O_5$) | 286 | | 154.4 | |
| KCl (62% $K_2O$) | 233 | | | 147.5 |
| Calcium silicate | 12 | | | |
| Water | 20 | | | |
| Fertilizer formula | | 703.7 | 154.4 | 147.7 |
| Fertilizer analysis | | 35.2 | 7.7 | 7.4 |

*Example 3*

| | Pounds | N | $P_2O_5$ | $K_2O$ |
|---|---|---|---|---|
| Urea (46% N) | 1,325 | 610.0 | | |
| Anhydrous ammonia (82% N) | 85 | 70.0 | | |
| Wet (23% $H_2O$) phosphoric acid (54% $P_2O_5$) | 400 | | 191.2 | |
| KCl (62% $K_2O$) | 204 | | | 126.5 |
| Hydrated silica | 12 | | | |
| Water | 20 | | | |
| Fertilizer formula | | 680.0 | 191.2 | 126.5 |
| Fertilizer analysis | | 34.0 | 9.6 | 6.3 |

*Example 4*

| | Pounds | N | $P_2O_5$ | $K_2O$ |
|---|---|---|---|---|
| Urea (46% N) | 1,448 | 666 | | |
| Anhydrous ammonia (82% N) | 45 | 37 | | |
| Wet (23% $H_2O$) phosphoric acid (54% $P_2O_5$) | 245 | | 132.3 | |
| KCl (62% $K_2O$) | 286 | | | 177.3 |
| Magnesium silicate | 12 | | | |
| Water | 20 | | | |
| Fertilizer formula | | 703 | 132.3 | 177.3 |
| Fertilizer analysis | | 35 | 6.6 | 8.9 |

*Example 5*

| | Pounds | N | $P_2O_5$ | $K_2O$ |
|---|---|---|---|---|
| Urea (46% N) | 1,364 | 627 | | |
| Anhydrous ammonia (82% N) | 64 | 53 | | |
| Wet (23% $H_2O$) phosphoric acid (54% $P_2O_5$) | 347 | | 187.4 | |
| KCl (62% $K_2O$) | 272 | | | 168 |
| Micro-Cel E | 12 | | | |
| Water | 20 | | | |
| Fertilizer formula | | 680 | 187.4 | 168 |
| Fertilizer analysis | | 34 | 9.4 | 8.4 |

Example 6

|  | Pounds | N | P$_2$O$_5$ | K$_2$O |
|---|---|---|---|---|
| Urea (46% N) | 1,413 | 650 | | |
| Anhydrous ammonia (82% N) | 61 | 50 | | |
| Wet (23% H$_2$O) phosphoric acid (54% P$_2$O$_5$) | 327 | | 176.6 | |
| KCl (62% K$_2$O) | 242 | | | 150 |
| Diatomaceous earth | 12 | | | |
| Water | 20 | | | |
| Fertilizer formula | | 700 | 176.6 | 150 |
| Fertilizer analysis | | 35.0 | 8.8 | 7.5 |

Example 7

|  | Pounds | N | P$_2$O$_5$ | K$_2$O |
|---|---|---|---|---|
| Urea (46% N) | 1,326 | 610 | | |
| Anhydrous ammonia (82% N) | 61 | 50 | | |
| Wet (23% H$_2$O) phosphoric acid (54% P$_2$O$_5$) | 327 | | 176.6 | |
| KCl (62% K$_2$O) | 329 | | | 204 |
| Micro-Cel E | 12 | | | |
| Water | 20 | | | |
| Fertilizer formula | | 660 | 176.6 | 204 |
| Fertilizer analysis | | 33 | 8.8 | 10.2 |

Example 8

|  | Pounds | N | P$_2$O$_5$ | K$_2$O |
|---|---|---|---|---|
| Urea (46% N) | 1,354 | 623 | | |
| Anhydrous ammonia (85% N) | 45 | 37 | | |
| Wet (23% H$_2$O) phosphoric acid (54% P$_2$O$_5$) | 245 | | 132.3 | |
| Micro-Cel E | 12 | | | |
| Water | 20 | | | |
| Fertilizer formula | | 660 | 132.3 | 235.6 |
| Fertilizer analysis | | 33 | 6.6 | 11.8 |

Quick-release fertilizers of the type described herein are less expensive than urea-formaldehyde fertilizers, and also are more effective in promoting the growth of desirable plants, especially in particular climates. The elimination of fines as well as oversized particles help to prevent injury to plants. Furthermore, the fact that the product is white makes it possible to apply the product to a lawn at a more even rate. The use of phosphoric acid rather than sulfuric acid also provides an important advantage over known fertilizers in that the phosphoric acid is a nutrient in itself and because the use of phosphoric acid prevents the formation of undesirable high temperatures in the granulator. By controlling the temperature in the granulator it is possible to avoid decomposition of the urea and the resultant loss of available nitrogen.

Now, having described the invention, what is claimed is:

A process for preparing quick release high-nitrogen-content chemical fertilizer compositions in pelletized form, said fertilizer compositions containing ingredients which are capable of supplying in available form from about 32% to about 35% nitrogen, from about 6% to about 8% P$_2$O$_5$, and from about 6% to about 8% K$_2$O, comprising:

(1) Introducing into a reaction zone which is substantially free from sulphuric acid:

From about 61% to about 73% by weight urea, from about 50% to about 80% of which has a particle mesh size from about −8 to about +14, From about 10% to about 13% by weight potassium chloride, From about 12% to about 16% by weight phosphoric acid, From about 2% to about 3% by weight anhydrous ammonia, and, From about 1% to about 2% by weight water, (2) Maintaining the temperature within said reaction zone at from about 140° F. to about 180° F. during the reaction between phosphoric acid and ammonia, to avoid decomposition of the urea and subsequent loss of available nitrogen, (3) Drying the resultant product to a moisture content of from about 0.5% to about 2.0% by weight, (4) Removing substantially all fine and oversize particles to provide an onsize product which will not cause burning and injury to plants and which has a particle size distribution as follows—

| Mesh size: | Percent by weight |
|---|---|
| −6 to +8 | 1. |
| −8 to +14 | 50–100. |
| −14 to +18 | 25–50. |
| −18 to +30 | 10 maximum. |
| −30 to +40 | 2 maximum. |
| −40 | 1 maximum. |

(5) Contacting said particles with a calcium silicate coating composition.

References Cited in the file of this patent

UNITED STATES PATENTS

| 2,827,368 | Mortenson | Mar. 18, 1958 |
| 2,903,349 | Bryant | Sept. 8, 1959 |
| 2,926,079 | Smith | Feb. 23, 1960 |
| 2,939,781 | Gilliam | June 7, 1960 |
| 2,971,832 | Stewart et al. | Feb. 14, 1961 |
| 3,005,696 | Hignett et al. | Oct. 24, 1961 |
| 3,053,622 | Bostwick | Sept. 11, 1962 |